US012537316B1

(12) United States Patent
Hand et al.

(10) Patent No.: US 12,537,316 B1
(45) **Date of Patent: *Jan. 27, 2026**

(54) REFRACTION ASSISTED RADIO FREQUENCY PHASED ARRAY REFLECTOR SYSTEMS

(71) Applicant: Lockheed Martin Corporation, Bethesda, MD (US)

(72) Inventors: Thomas Henry Hand, Highlands Ranch, CO (US); Joshua David Gustafson, Castle Rock, CO (US); Carlos James Romero, Littleton, CO (US); Joseph M. Torres, Littleton, CO (US); Elie Germain Tianang, Aurora, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 403 days.

This patent is subject to a terminal disclaimer.

(21) Appl. No.: 18/152,896

(22) Filed: Jan. 11, 2023

Related U.S. Application Data

(60) Provisional application No. 63/298,921, filed on Jan. 12, 2022.

(51) Int. Cl.
*H01Q 21/06* (2006.01)
*H01Q 19/06* (2006.01)

(52) U.S. Cl.
CPC ......... *H01Q 21/065* (2013.01); *H01Q 19/062* (2013.01)

(58) Field of Classification Search
CPC ...... H01Q 21/065; H01Q 19/062; H01Q 9/28; H01Q 19/102; H01Q 15/16; H01Q 25/007; H01Q 3/2658; H01Q 19/17
See application file for complete search history.

(56) References Cited

U.S. PATENT DOCUMENTS

| | | | | |
|---|---|---|---|---|
| 5,206,658 | A * | 4/1993 | Wokurka | H01Q 25/008 343/781 R |
| 6,844,862 | B1 | 1/2005 | Cencich et al. | |
| 7,839,349 | B1 * | 11/2010 | West | H01Q 15/148 343/781 CA |
| 11,264,729 | B2 | 3/2022 | Hand et al. | |
| 11,688,950 | B2 | 6/2023 | Bhattacharyya et al. | |
| 12,166,297 | B1 * | 12/2024 | Tianang | H01Q 15/16 |
| 2011/0095953 | A1 * | 4/2011 | Lier | H01Q 19/17 343/755 |

(Continued)

OTHER PUBLICATIONS

Cooley, Michael, "Phased Array-Fed Reflector (PAFR) Antenna Architectures For Space-Based Sensors," IEEE, 11 pages, 2015.

(Continued)

*Primary Examiner* — Dameon E Levi
*Assistant Examiner* — Michael M Bouizza

(57) ABSTRACT

Provided herein are various enhancements for radio frequency antennas and antenna arrangements. In one example, an apparatus comprises a reflector for radio frequency energy having a reflector surface, and a lens element. The lens element is configured to alter a distribution of at least a portion of the radio frequency energy reflected by the reflector surface over a detection area of a feed array positioned a selected distance from the lens element.

16 Claims, 5 Drawing Sheets

(56) References Cited

U.S. PATENT DOCUMENTS

| | | | | |
|---|---|---|---|---|
| 2015/0200452 | A1* | 7/2015 | Oh | H01Q 19/062 343/754 |
| 2019/0109384 | A1* | 4/2019 | Rankin | H01Q 15/14 |
| 2019/0123450 | A1* | 4/2019 | Thiagarajan | H01Q 19/062 |
| 2021/0288415 | A1 | 9/2021 | Bennett et al. | |

OTHER PUBLICATIONS

Erukhimovich, A. et al., Abstract for "Development Of Double-Reflector Antennas With A Displaced Focal Axis," Radiotekhnika, vol. 30, pp. 54-59, Sep. 1975.
Fenn, Alan J. et al., "Design And Analysis Of An Axisymmetric Phased Array Fed Gregorian Reflector System For Limited Scanning," 4 pages, Jan. 22, 2016.
Moreira, Fernando J. S. et al., "Generalized Classical Axially Symmetric Dual-Reflector Antennas," IEEE Transactions on Antennas and Propagation, vol. 49, No. 4, pp. 547-554, Apr. 2001.
Prata, Jr., Aluizio et al., "Displaced-Axis-Ellipse Reflector Antenna For Spacecraft Communications," IEEE, pp. 391-395, 2003.
Radartutorial, "ARSR-4," https://www.radartutorial.eu/19.kartei/03.atc/karte028.en.html, 1 page, Nov. 10, 2021.
Wikipedia, "Pave Paws," https://web.archive.org/web/20221130211402/https://en.wikipedia.org/wiki/PAVE_PAWS, 10 pages, Sep. 10, 2022.
Zhu, Daohong et al., "MM-Wave Cylindrical Dielectric Lens Antenna For Full Azimuth Scanning Coverage," 2011 China-Japan Joint Microwave Conference, 4 pages, Apr. 20-22, 2011.
Moreira, Fernando J.S.; "Design And Rigorous Analysis Of Generalized Axially-Symmetric Dual-Reflector Antennas"; Ph.D. Dissertation; 291 pages; Aug. 1997.

* cited by examiner

REFRACTION ASSISTED RADIO FREQUENCY PHASED ARRAY REFLECTOR SYSTEMS

RELATED APPLICATIONS

This application hereby claims the benefit of and priority to U.S. Provisional Patent Application No. 63/298,921, titled "WIDE SCAN PHASED ARRAY FED REFLECTOR SYSTEMS," filed Jan. 12, 2022, which is hereby incorporated by reference in its entirety.

TECHNICAL BACKGROUND

Microwave radio frequency (RF) antenna designs can be formed from a grid of many individually controlled RF elements, often called an Electronically Steerable Array (ESA). ESAs can include Direct Radiating Arrays (DRAs) and reflector-based architectures, referred to as Phased Array Fed Reflectors (PAFRs). DRAs can provide wide scan and wide band performance for properly selected RF feed element types and feed element grid spacings. However, one difficulty associated with DRA architectures is that, for a large gain and wide scan, the radiating aperture requires numerous feed elements, and a correspondingly large aperture size. This can place a substantial increase in the power needed to operate the array, as well as increase the overall weight, size envelope, and cost.

PAFRs include a generally smaller array of feed elements coupled with a corresponding reflector element, which can provide for limited scan operations while using a stationary reflector. One example PAFR architecture produces a single focal point that limits the achievable scan volume to only a few beamwidths off boresight by using changes to amplitude and phase weights of the feed array. Unfortunately, defocusing the center of the feed array phase from the single focal point when conducting these scanning operations leads to large scan losses and diminished efficiency for most scan angles. Thus, most PAFRs include gimbals for greater angular coverage and scanning, which also increases overall weight, size envelope, and cost, as well as reduced reliability.

Another example PAFR architecture includes a ring-focus PAFR that has a center-fed dual-reflector arrangement. The feed elements can then be placed in a concentric ring arrangement at or near the focal ring plane. This can widen the scan of reflector systems by using a ring-based reflector focus, and allow incident RF energy to be spread over the feed array. However, due to the reflector arrangement in ring-focus PAFR systems, an incident plane wave tends to scatter in a divergent manner, sometimes referred to as the "sprinkler" effect since the RF energy 'rays' trace an expanding lawn sprinkler pattern. Less RF energy is then incident on the feed array, lowering the overall aperture efficiency. Thus, the ring-focus PAFR architecture, while providing a wider field of view than a conventional point-focus PAFR, typically suffers from low aperture efficiency (e.g., 5-10%) due to divergent effects of the main reflector.

OVERVIEW

Provided herein are various enhancements for radio frequency (RF) antennas and antenna arrangements in Phased Array Fed Reflector (PAFR) architectures. The examples herein include an RF lens element or refraction element between the feed array and the reflector components. This configuration can redirect or redistribute a portion of the reflected RF energy onto the positioning of the feed array elements. In divergent reflector examples (e.g., ring-focus PAFR), the RF lens elements can be employed to refract incident RF energy onto a feed array. In convergent reflector examples (e.g., point-focus PAFR), the RF lens elements can be employed to distribute the reflected incident RF energy across a larger portion of the feed array. Incorporation of a lens element between the reflector and the feed array can result in an increase in aperture efficiency, such as 20-25% efficiency, up from 5-10% for a ring-focus PAFR without a lens. For a given gain requirement, this enables a smaller reflector and feed array for the antenna system, resulting in reduced overall weight, size envelope, and cost. Thus, the "sprinkler" effect mentioned herein can be mitigated using the lens elements or refraction elements discussed herein.

In one example implementation, an apparatus comprises a reflector for radio frequency energy having a reflector surface, and a lens element. The lens element is configured to alter a distribution of at least a portion of the radio frequency energy reflected by the reflector surface over a detection area of a feed array positioned at a selected distance from the lens element.

In another example implementation, an antenna system includes a reflector having a reflector surface for radio frequency energy, and a base configured to mount the reflector. The system also includes a refraction element positioned between a feed array and a reflector surface, the refraction element configured to alter a distribution of at least a portion of the radio frequency energy reflected by the reflector surface over a detection area of the feed array.

In yet another example implementation, a method includes forming a radio frequency reflector having a surface, and forming a lens element having a refractive property for radio frequency energy. The method includes positioning the lens element such that at least a portion of incident radio frequency energy reflected by the surface has an altered distribution over a detection area of a feed array positioned a selected distance from the lens element.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
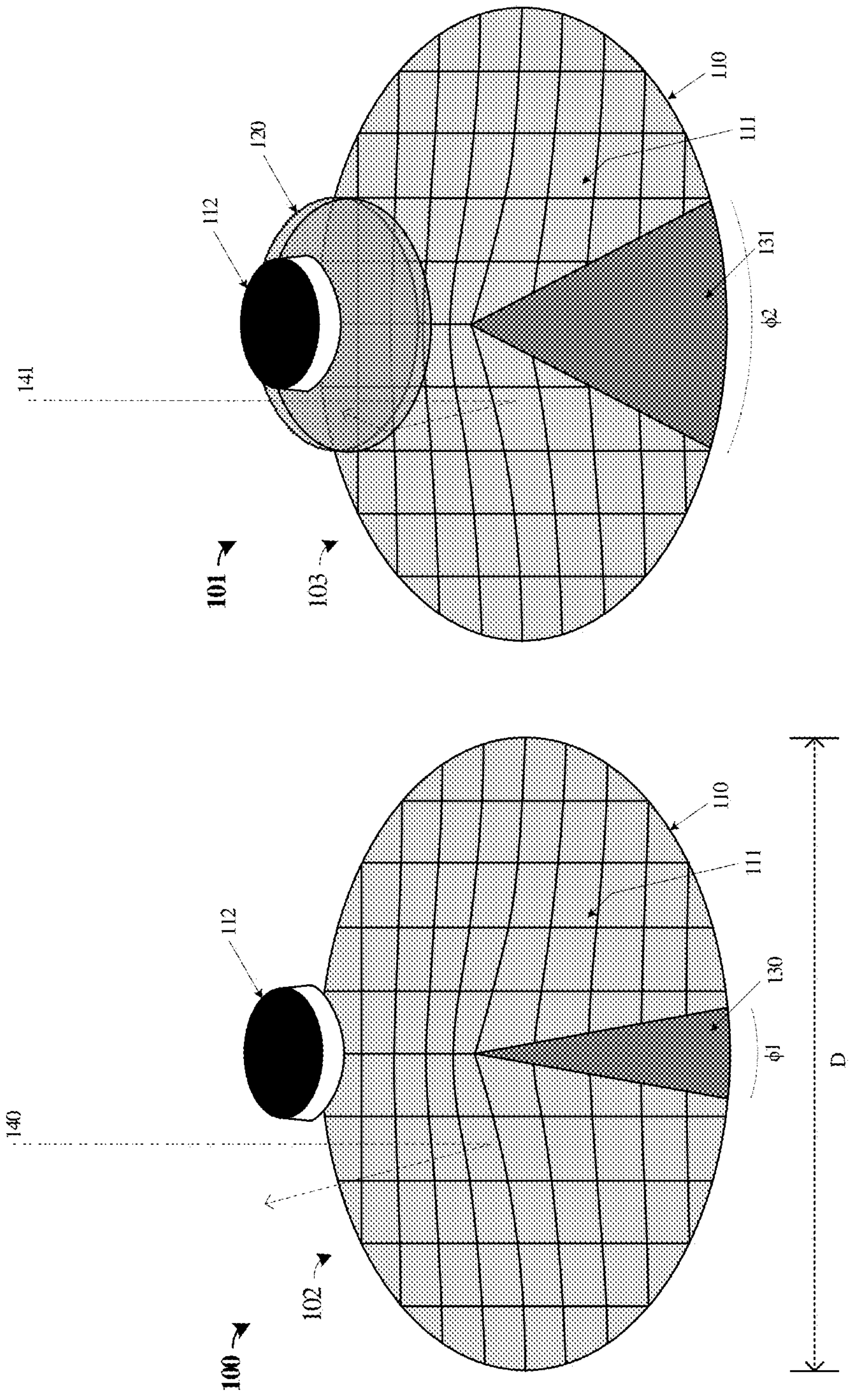
FIG. 1 illustrates an example antenna configuration in an implementation.

Some types of microwave radio frequency (RF) antennas can be formed from a grid or repeating arrangement of many individually controlled RF antenna elements. Examples of these antennas include phased arrays and Electronically Steerable Arrays (ESAs). Antenna systems that employ ESAs can include Direct Radiating Arrays (DRAs) that directly (without a reflector element) emit or receive energy with a grid of RF antenna elements, and reflector-enabled architectures which include Phased Array Fed Reflectors (PAFRs). DRAs and PAFRs can be deployed in narrow or wide field of view (FOV) antenna configurations. Wide FOV antenna configurations are desirable for many applications. However, to achieve wide FOV, large arrays or multi-faceted arrays are employed for DRAs, and PAFRs may include gimbals which rotate or turn the array/reflector assembly rapidly to scan over a wider field of view. The examples herein can provide for wide FOV applications without the need for gimbaling or the need to incorporate large multi-faceted ESAs. Example applications include radar, airborne communications at low altitudes that need link closure at horizon and nadir angles, maritime antennas in "list" conditions attempting to maintain link closure with an airborne or satellite terminal, and ground, airborne, and space-based ESAs that require large scan volumes. When conventional DRAs and PAFRs are employed in these various applications, the antenna systems are typically over-designed or require additional equipment to meet performance requirements at the most extreme geometries.

Provided herein are various enhancements for RF antennas and antenna arrangements with reflectors, such as in Phased Array Fed Reflector (PAFR) architectures, although the enhanced elements discussed herein are not limited to implementations that rely on reflectors or arrayed antenna architectures. RF lens elements or RF refraction elements can be included between reflector components of an antenna system and the corresponding grid of antenna elements in the RF feed array. This RF refraction configuration can redirect or redistribute a portion of the reflected RF energy for more advantageous distribution of the RF energy onto the feed array elements. For example, in divergent reflector examples (e.g., ring-focus PAFR), the RF refraction elements can be employed to focus more reflected incident RF energy onto a feed array for improved total efficiency. In convergent reflector examples (e.g., point-focus PAFR), the RF refraction elements can be employed to distribute the reflected incident RF energy across a larger fraction of the feed array. Incorporation of a refraction element between the reflector and the feed array can result in an increase in aperture efficiency for frequencies spanning approximately 0.02-55 GHz. These increases in aperture efficiency can include 20-25% aperture efficiency, up from 5-10% for a ring-focus PAFR without a lens. For a given gain requirement, this enables a smaller reflector and feed array for the antenna system, resulting in reduced overall weight, size envelope, and cost. As an exemplar, refraction elements can also reduce a high frequency ESA (spanning 18-55 GHz) consumed power under certain configurations from 1,600 Watts (W) to <500 W. Thus, the "sprinkler" effect mentioned herein can be mitigated using the lens elements or refraction elements discussed herein.

Turning now to a first example implementation, FIG. 1 is presented. FIG. 1 includes antenna views 100 and 101 including antenna arrangements 102 and 103, respectively. Arrangements 102-103 both include reflector 110 and feed array 112. Reflector 110 has reflector surface 111 and diameter 'D' (e.g., 1.0 meter). In this example, reflector surface 111 comprises a tilted paraboloid of revolution having a divergent configuration for reflected RF energy. This tilted paraboloid of revolution can be defined by a paraboloid of revolution from a 'lower branch' of a parabola. A further discussion of example shapes of reflector 110 and reflector surface 111 are included below. The contour lines in FIG. 1 are merely included to illustrate the corresponding shape and contours of reflector surface 111.

Example RF ray 140 is shown as a portion of a plane wave impinging onto reflector 110. When RF energy (represented by a plane wave) is incident onto and interacts with reflector 110, a divergent or scattered pattern results from specular reflection off reflector surface 111, leading to a decreased density of RF energy onto feed array 112. Also, this divergent pattern of RF energy creates "wedge" 130, sweeping through angle ϕ1 on reflector surface 111, contributing to a corresponding pattern of RF energy reflected onto a subset of feed array 112. Divergent rays, such as RF ray 140, that "miss" feed array 112 can lower overall aperture efficiency. An incident plane wave induces a non-uniform amplitude taper on feed array 112. Because most of RF energy diverges away from array feed 112, the resulting effect is a low aperture efficiency (typically 5-10%), assuming the feed is reasonable small, such as 15-20% the diameter of reflector surface 111.

Arrangement 103 includes reflector 110 and feed array 112, as well as lens element 120. Example RF ray 141 is shown as a portion of a plane wave impinging onto reflector 110. Lens element 120 is positioned between reflector 110 and feed array 112 such that at least a portion of the RF energy reflected by reflector surface 111 is bent or refracted back towards feed array 112, as exemplified by RF ray 141. In the divergent antenna configuration shown in FIG. 1, lens element 120 converges a portion of the RF energy, normally subject to the "sprinkler" effect, back towards feed array 112, resulting in higher efficiency and without the use of lens element 120. As an example, the resultant peak of beam directivity can be improved by ~6 dB at 35 GHz corresponding to an aperture efficiency of 20-25% efficiency, up from 5-10% without use of lens element 120 for a similar reflector configuration. Also, this converged pattern of RF energy from lens element 120 creates a larger "wedge" 131, sweeping through angle $2 on reflector surface 111, contributing to a corresponding pattern of RF energy reflected onto an increased subset of feed array 112. Lens element 120 enables a larger portion of reflector surface 111 to be used in beam formation, resulting in a larger gain and more efficient beam, as well as increased sensitivity for Receive (Rx) systems and equivalent isotropic radiated power (EIRP) for Transmit (Tx) systems. For a given gain requirement, this can lead to a smaller reflector size, further reducing power requirements and cost.

Turning now to a more detailed discussion on the elements of FIG. 1, lens element 120 comprises an RF-refracting material which allows passage of RF energy therethrough to reach feed array 112. Various configurations, thicknesses, diameters, radii of curvatures, and positioning of lens element 120 can be provided, and can depend on the application and may be empirically determined to provide a threshold level of aperture efficiency performance. The refraction properties of lens element 120 can be achieved using geometry of a uniform or homogenous refractive index material with a refractive index greater than 1, such as a biconvex shape or other shaped lens of appropriate refractive index and radius of curvature. One example refractive index is Rexolite with an index n=2.55. Example refractive index materials include various polymers, ceramics, or glass materials. The radii of curvature can be similar or different among the top/bottom radii for a biconvex lens. The refraction property of lens element 120 can instead be achieved using a graded index material or inhomogeneous material for which the edge geometry is less critical, which may comprise a generally uniform thickness or a generally rectilinear shape. A graded index material can include a generally flat cylinder having voids therein to achieve the desired refractive property. The refraction property of lens element 120 can be achieved using a Frequency-Selective Surface (FSS), a metalens, Fresnel lens, grating lens, or other lens configuration to enable wide angle scanning of an antenna as discussed herein. At times, weight or mass of lens element 120 might exceed threshold levels or requirements of a design, in these examples, multi-layer lenses formed from printed circuit board substrate material and polymer foam material can be employed.

Reflector 110 comprises a paraboloid of revolution which forms reflector surface 111. Although a divergent reflector configuration is shown for reflector surface 111, other reflector configurations, such as convergent circular paraboloids, can instead be employed. Reflector 110 can be formed using any suitable manufacturing process, such as machining, lathing, sheet metal forming, additive manufacturing, casting, molding, or other manufacturing processes, including combinations thereof. The manufacturing process can include forming a paraboloid of revolution having a configuration noted herein. The surface and material of reflector 110 typically comprises electrically conductive materials and surface properties providing specular reflection to RF signals over at least a target frequency range or desired bandwidth. Materials can be any suitable conductor material, such as metallic materials, metallic alloys, or composite structures having conductive surface layers or coatings. Example metallic materials can include aluminum, gold, copper, steel, nickel, titanium, or various combinations and alloys thereof. Other suitable materials can be employed than the various enumerated ones herein.

Reflector surface 111 comprises a generally conical shape with a concave parabolic nappe. The conical shape has a convex side and a concave side. In FIG. 1, the convex side comprises the 'top' forming reflector surface 111 and the concave side comprises the 'bottom' or underside of reflector surface 111. The concave surface can be omitted in some examples that have a material 'bulk' filling a volume to form reflector 110, with a convex surface of the material bulk forming reflector surface 111. The material bulk might be solid, hollow, or webbed for structural stability and weight reduction, among other configurations. An axially displaced configuration can instead be employed, or configurations having a central gap or aperture formed in reflector surface 111 for weight reduction, cabling apertures, structural supports, thermal regulation elements, or an aperture for passage of secondary- or tertiary-reflected RF signals, among other purposes. Reflector 110 or reflector surface 111 is not shown as tilted relative to the focal plane in FIG. 1 for beam coverage within a conical scan volume about the boresight. In other examples, reflector 110 or reflector surface 111 might be tilted a number of degrees from nominal for beam coverage about a desired scan volume.

Feed array 112 comprises an array of a selected quantity of RF feed elements in a grid or other regular pattern, defined in part by a modular grid-shaped 'unit cell' feed element. The RF feed elements can, for example, comprise various antennas or antenna types, such as horn antennas, aperture antennas, patch antennas, Vivaldi antennas, magnetoelectric dipole antennas, or other antenna elements suitable for packing into electronically steered arrays or other phased array styles and types. The RF feed element quantity, size, and antenna type/configuration can depend on the frequency range or bandwidth employed, the power requirements, desired beam directivity, gain targets, and various other operational targets for the antenna. Various structural support members can be coupled to feed array 112 to position feed elements a selected distance from reflector surface 111 and from lens element 120. Lens element 120 can also be coupled to or supported by such support members. The RF feed elements of feed array 112 can be arranged parallel to the focal plane or arranged on an inclined angle relative to the focal plane. The RF feed elements of feed array 112 can have a radial grid arrangement, a square grid arrangement, a rectangular grid arrangement, circular/elliptical grid arrangement, a hexagonal grid arrangement, an irregular grid arrangement, or a sparse grid arrangement, among other arrangements.

Feed array 112 and the RF feed elements can have various coaxial cabling, connectors, waveguide structures, orthomode transducers (OMTs), couplers, polarizers, RF filters, structural supports, backplanes, circuit board elements, and other elements to transfer radiative RF signals to/from waveguides, conductive elements, or transmission line elements. Various control elements or electronics can be included, such as various RF circuitry, low-noise amplifiers, beamforming modules, phase shifters, time delay units, array control elements, attenuation control components, and the like. RF feed elements can employ right-hand and left-hand circularly polarized orthogonal signals which are converted to linearly polarized signals for handling by the feed circuitry, among other configurations.

Figure 2:
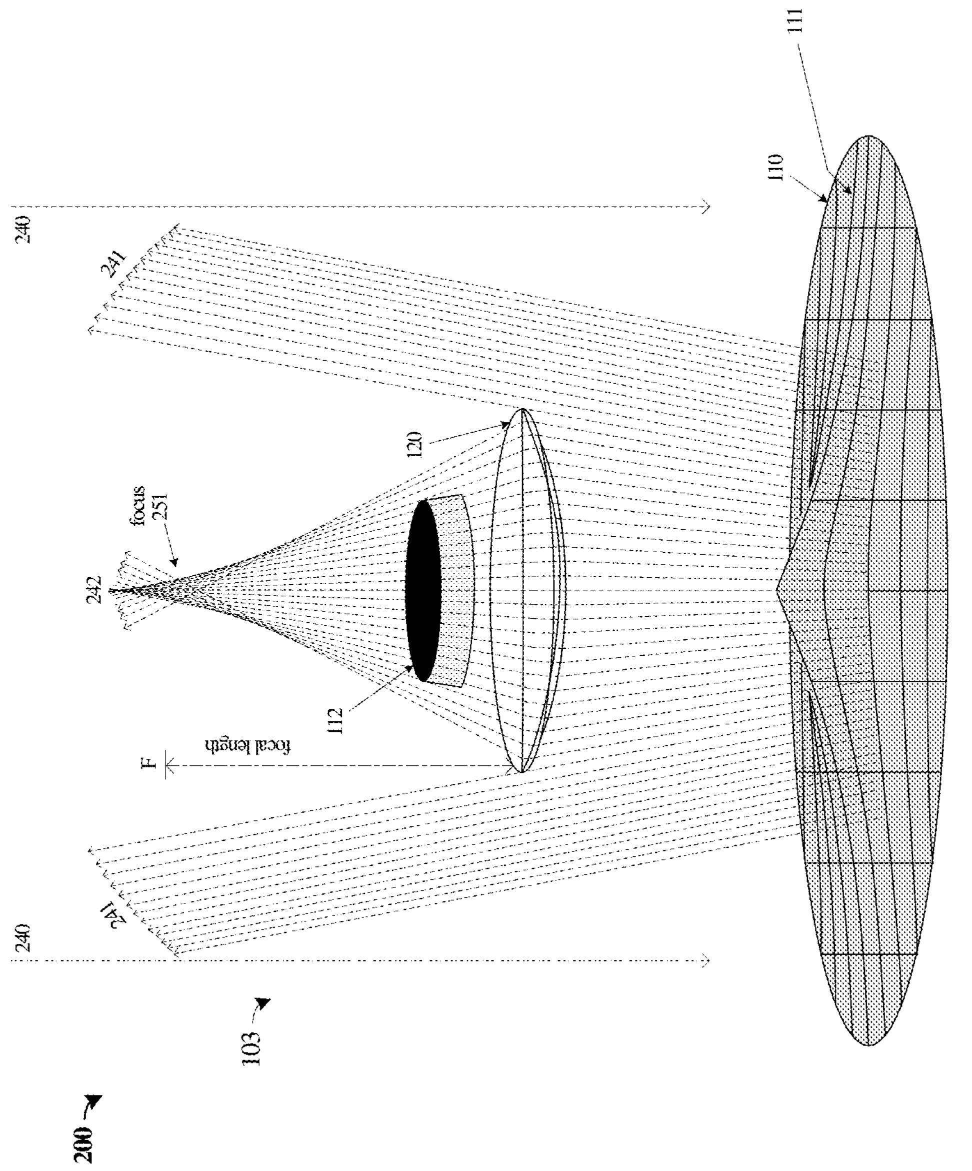
FIG. 2 illustrates an example antenna configuration in an implementation.

FIG. 2 illustrates a further configuration of elements of antenna arrangement 103 in view 200. While similar elements of FIG. 1 are included in FIG. 2, it should be understood that variations are possible. Antenna arrangement 103 includes reflector 110 having reflector surface 111, feed array 112, and lens element 120. A more detailed view of incoming and reflected RF energy is illustrated in FIG. 2.

Incoming RF energy 240 is shown incident onto reflector surface 111, which is represented by example 'rays' as comprising a portion of an incoming plane wave. From here, the interaction with reflector surface 111 establishes reflected RF energy 241, shown with many representative rays experiencing divergent or diffractive behavior from the geometry of reflector surface 111. This can be referred to as the "sprinkler effect," which would normally reduce the amount of RF energy provided to feed array 112, and an overall lowering of aperture efficiency for antenna arrangement 103. However, lens element 120 is included which refracts a portion 242 of reflected RF energy 241 to provide a greater amount of RF energy 241 to feed array 112.

Feed array 112 is positioned a selected distance apart from reflector surface 111, which can be based on the application, stackup requirements, or other parameters. Lens element 120 is positioned between reflector surface 111 and feed array 112 such that feed array 112 is placed within focal length 'F' of lens element 120. Since lens element 120 establishes a generally converging effect on reflected RF energy 241, the RF energy is concentrated onto feed array 112 and over the interaction surface of feed array 112 facing reflector surface 111. Focus 251 is shown in FIG. 2 as well, as representing one spatial limit on focal length F, the other spatial limit being lens element 112.

Figure 3:
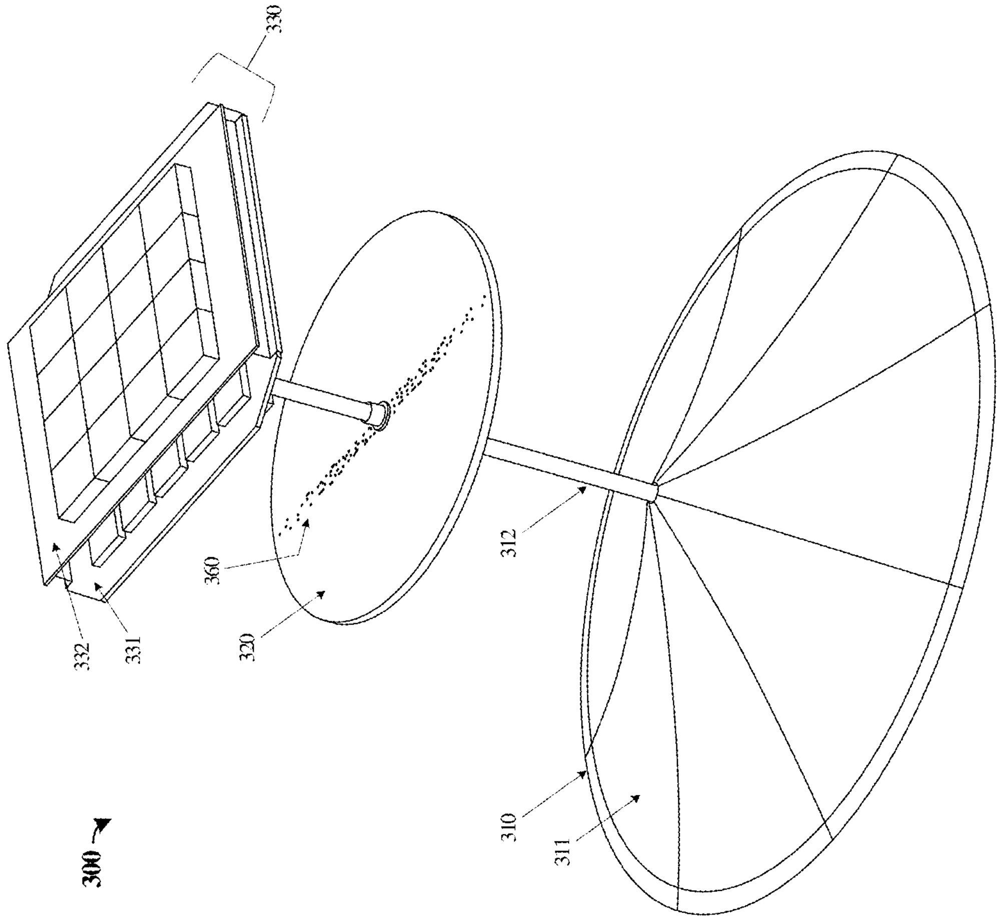
FIG. 3 illustrates an example antenna assembly in an implementation.

FIG. 3 illustrates example antenna assembly 300. Assembly 300 can be an example implementation of the antenna configurations in FIGS. 1-2, although variations are possible. Assembly 300 includes axial structural support 312, reflector 310, lens element 320, and feed assembly 330. Various radome elements or covers can be employed over elements of antenna assembly 300 to protect from dust, humidity, debris, visual inspection, tampering, and various contaminants. Reflector 310 includes reflector surface 311 which directs incident RF energy towards lens element 320 and feed assembly 330. However, due in part to the divergent geometry of reflector surface 311, the amount of RF energy that would normally be incident onto feed assembly 330 is increased by lens element 320.

Axial structural support 312 forms an axial arrangement among reflector 310, lens element 320, and feed assembly 330. Support 312 thus comprises a structure configured to mount and axially align reflector 310, lens element 320, and at least receiver array 331 of feed assembly 330. Support 312 can comprise metal, composite, or dielectric materials which carry the elements of assembly 300. Various non-conductive coatings or dielectric coatings or surface layers can be incorporated onto support 312. Cabling, waveguides, and other power or interconnect can be routed through voids or conduits formed in support 312.

Feed assembly 330 includes receiver array 331 and transmit array 332. Receiver array 331 has an array of antenna elements facing reflector surface 311. Transmit array 332 has an array of antenna elements facing outward along the axis defined by support 312. In receive modes, a larger aperture can be established using reflector surface 311 and lens element 320 to direct incident RF energy onto receive array 331. In transmit mode, transmit array 332 can operate as a direct radiating array (DRA) using ESA techniques. A stacked arrangement is shown in FIG. 3, with receiver array 331 and transmit array 332 each mounted on corresponding substrates, such as circuit board assemblies or other structural and chassis elements.

Examples of antenna assembly 300 can be deployed in ground-based or space-based applications, among others. In ground-based applications, reflector 310 might be mounted to a base or a ground mount with support 312 generally vertical. In this configuration, reflector surface 311 has 360-degree azimuth scan volume for incoming signals within an angular elevation/altitude range that varies based on local obstructions, the geometry of reflector surface 311, and the size/positioning of lens element 320 and feed assembly 330. In space-based applications, reflector might be mounted to a spacecraft or satellite and facing the surface of an orbited body, for example. Alternatively, an angled mounting arrangement might be employed to ensure coverage of signals to within the angular elevation/altitude range of antenna assembly 300.

For far-field transmissions, these arrive at reflector surface 311 essentially as a plane wave having a particular angular approach (elevation/altitude). Reflector surface 311 establishes a sliver, slice, or wedge pattern 360 of RF energy onto receiver array 331 of feed assembly 330. Lens element 320 alters or redistributes pattern 360 of RF energy (incident onto the side of lens element 320 facing reflector surface 311) into a more favorable spread of energy over receiver array 331. In this manner, more of the RF energy incident onto reflector surface 311 is captured and detected by antenna assembly 300. Moreover, in certain configurations, the spread of RF energy over the detection surface of receiver array 331 can be more distributed over a larger detection area. This can produce increased sensitivity to incident RF signals and an overall more efficient RF aperture.

Figure 4:
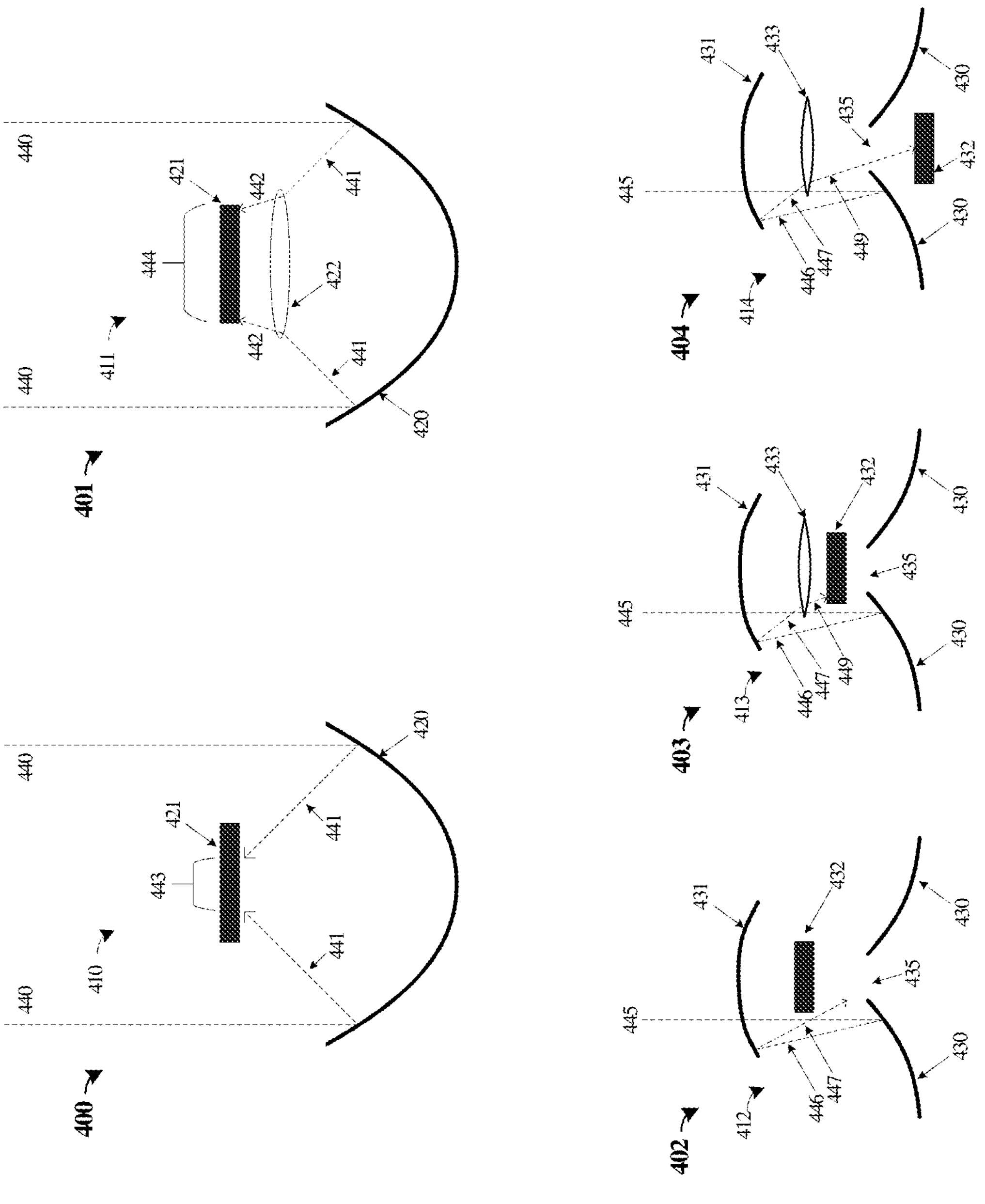
FIG. 4 illustrates example antenna configurations in an implementation.

FIG. 4 illustrates further configurations and antenna arrangements that employ a lens element. Views 400-401 illustrate cross-sectional side views of configurations 410-411 having convergent style primary reflectors. Views 402-404 illustrate cross-sectional side views of configurations 412-414 having two-reflector configurations.

In contrast to divergent styles of primary reflectors, convergent styles of primary reflectors have at least one reflector with a focal plane and a parabolic curvature configured to receive RF energy having a first gain and provide reflected RF energy having a second gain greater than the first gain. Convergent styles of primary reflectors have various focal length-to-diameter ratio values, depending on application. In view 400, the focal length corresponds to a distance between feed array 421 and a reflector surface of reflector 420, referred to as stackup (A), and a diameter (D) corresponds to a diameter of reflector surface of reflector 420. One example range includes a focal length-to-diameter ratio (F/D) of 0.5 to 1.0. Inclusion of lens element 422 in antenna configuration 411 can alter the focal length of the entire antenna system and provide a secondary focal length associated with the lens element. Lens element 422 can be positioned within a focal length of reflector 420 to spread or distribute RF energy across a larger portion of feed array 421. This can reduce stackup (A) to diameter (D) ratio (A/D) for a given design. For example, an A/D ratio of 0.15 might be established without lens element 422, to an A/D ratio of 0.08 with lens element 422.

In view 400, antenna configuration 410 includes reflector 420 and feed array 421, and represents an antenna configuration without a corresponding lens element. As seen in view 400, incident RF energy 440 is reflected by reflector 420 (as reflected RF energy 441) in a convergent or focusing configuration towards a focal point (not shown). Feed array 421 is placed at or near the focal point to receive reflected RF energy 441. However, for a given scan volume, feed array 421 might only be illuminated over sub-portion 443 of the entire active surface defined by the array of antenna elements. This can lead to lower aperture efficiency, among other effects.

In view 401, antenna configuration 411 includes reflector 420, feed array 421, and lens element 422. As seen in view 401, incident RF energy 440 is reflected by reflector 420 (as reflected RF energy 441) in a convergent or focusing configuration towards a focal point (not shown). Lens element 422 alters the focal point for RF energy 441 to spread or diverge RF energy 441 over a larger active area of feed array 421. Feed array 421 is placed within the focal length of lens element 422. Advantageously, for a given scan volume, feed array 421 can now be illuminated over a larger portion 444, which may include the entire active surface.

Views 402-404 correspond to a dual-reflector architecture which may be center-fed. The dual-reflector architecture focuses a plane wave to a focal point. Secondary reflector 431 can comprise a tilted conic (e.g., ellipse) of revolution and primary reflector 430 can comprise a parabola of revolution. In this example, primary reflector 430 has a central gap or aperture 435 through which RF energy may be directed, similar to a Gregorian optics arrangement. This configuration allows for re-positioning of feed array 432. The main paraboloid axis may be tilted 40 degrees from nominal for a 40-degree to 60-degree beam coverage, and the pattern performance is typically symmetric about this axis.

In view 402, antenna configuration 412 includes primary reflector 430, secondary reflector 431, and feed array 432, and represents an antenna configuration without a corresponding lens element. As seen in view 402, incident RF energy 445 is reflected by primary reflector 430 (as first reflected RF energy 446) in a divergent configuration, which is then incident onto secondary reflector 431. First reflected RF energy 446 is then reflected by secondary reflector 431 (as second reflected RF energy 447) in a convergent configuration toward a focal point (not shown). Feed array 432 is placed at or near the focal point to receive second reflected RF energy 447. However, for a given scan volume, feed array 432 might only be illuminated over sub-portion of the entire active surface or receive less than the desired amount of RF energy.

In view 403, antenna configuration 412 includes primary reflector 430, secondary reflector 431, feed array 432, and lens element 433. As seen in view 403, incident RF energy 445 is reflected by primary reflector 430 (as first reflected RF energy 446) in a divergent configuration, which is then incident onto secondary reflector 431. First reflected RF energy 446 is then reflected by secondary reflector 431 (as second reflected RF energy 447) in a convergent configuration toward a focal point (not shown). Lens element 433 alters the focal point for RF energy 447 to spread or diverge RF energy 447 (as refracted RF energy 449) over a larger active area of feed array 432 (view 403) or to better reposition feed array 432 (view 404) to be fed through aperture 435. Feed array 432 is placed within the focal length of lens element 433.

Figure 5:
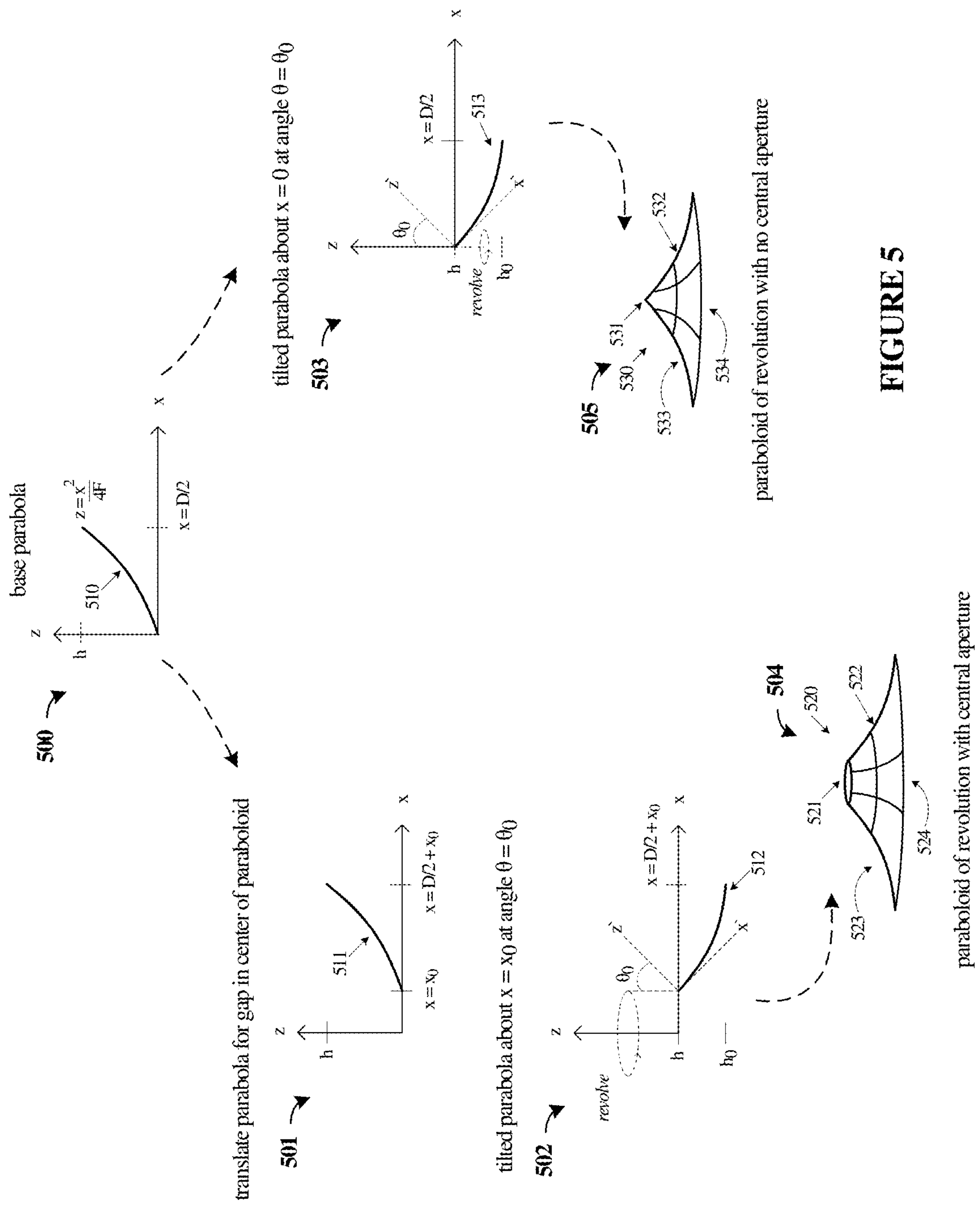
FIG. 5 illustrates example paraboloids of revolution in an implementation.

FIG. 5 illustrates example paraboloids of revolution in views 500-505. Two example paraboloids of revolution are shown, namely view 504 with a paraboloid of revolution 520 with central aperture 521 and view 505 with paraboloid of revolution 530 having central point 531 without a central aperture. To illustrate how to form these paraboloids of revolution, graphs are included in views 500-503.

In view 500, a base parabolic segment is shown in plot 510 within axes z and x, defined parametrically by $z=x^2/4F'$ and having a height 'h' and width D/2. The designation 'F' in plot 510 refers to the focal length, and 'D' refers to the diameter of the reflector surface. Thus, plot 510 defines half of the diameter of a parabolic surface. Turning now to view 501, a translation is performed on plot 510 to establish plot 511 having an offset along the x-axis of $x_0$. This translation is used to establish a central aperture 521 within paraboloid of revolution 520. From here, view 502 shows plot 512 comprising a tilted parabolic segment. Plot 512 is tilted by angle of $\theta_0$, to establish a final height of the paraboloid of $h_0$. Plot 512 can be revolved about the z-axis (z=0) to establish paraboloid of revolution 520 having height $h_0$ and diameter $D+x_0$. Paraboloid of revolution 520 forms an open conical shape having convex side 523 and concave side 524, and also includes central aperture 521. Paraboloid of revolution 520 has concave parabolic nappe 522 on convex side 523 which forms a reflector surface. A lens element can be positioned between the reflector surface and a feed array offset from the convex side.

In an alternative arrangement, shown in view 503, no translation is performed on plot 510, just the tilt. View 502 shows plot 513 comprising a tilted parabolic segment. Plot 513 is tilted by angle of $\theta_0$, to establish a final height of the paraboloid of $h_0$. Plot 513 can be revolved about the z-axis (z=0) to establish paraboloid of revolution 530 having height $h_0$ and diameter D. Paraboloid of revolution 530 forms an open conical shape having convex side 533 and concave side 534, and also includes central point 531. Paraboloid of revolution 530 has concave parabolic nappe 532 on convex side 533 which forms a reflector surface. A lens element can be positioned between the reflector surface and a feed array offset from the convex side.

Although the examples herein generally refer to RF Receive (Rx) configurations of antenna systems, similar concepts can apply to Transmit (Tx) configurations. Example frequency ranges for RF components, configurations, systems, and arrangements herein include various RF bands, such as microwave frequencies capable of transiting RF waveguide structures. Different frequency bands can be supported by similar architectures as shown herein, with associated geometry scaling to suit the selected frequency ranges. While the examples herein cover portions of the Ka-band noted above, other examples might include the Ka band or Ku band or other portions of the K bands (approximately 12 to 40 GHZ), or X band (approximately 8 to 12 GHz). Other examples might be configured to support a frequency range corresponding to the IEEE bands of S band, L band, C band, X band, Ku band, K band, Ka band, V band, W band, among others, including combinations thereof. Other example RF frequency ranges and service types include ultra-high frequency (UHF), super high frequency (SHF), extremely high frequency (EHF), or other parameters defined by different organizations.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. An apparatus, comprising:

a primary reflector having a primary reflector surface providing a divergent configuration for incident radio frequency energy;

a secondary reflector having a secondary reflector surface providing a convergent configuration for the radio frequency energy received from the primary reflector surface; and a lens element configured to diverge a distribution of at least a portion of the radio frequency energy reflected by the secondary reflector surface to increase the distribution of the portion over a detection area of a feed array positioned a selected distance from the lens element.

2. The apparatus of claim 1, wherein the primary reflector comprises a paraboloid of revolution forming a conical shape having a concave parabolic nappe and a central aperture, with a convex side of the primary reflector comprising the primary reflector surface;

wherein the lens element is positioned between the secondary reflector surface and the primary reflector surface; and wherein the feed array is positioned on a side of the primary reflector comprising the concave parabolic nappe and configured to receive a corresponding portion of the radio frequency energy through the aperture as directed by the lens element from the convex side of the primary reflector.

3. The apparatus of claim 1, wherein the primary reflector comprises a paraboloid of revolution forming a conical shape having a concave parabolic nappe, and a convex side of the primary reflector comprising the primary reflector surface.

4. The apparatus of claim 3, wherein the lens element is positioned between the secondary reflector surface and the feed array offset from the convex side of the primary reflector surface.

5. The apparatus of claim 1, comprising:

a structure configured to mount and axially align at least the primary reflector, the lens element, and the feed array.

6. The apparatus of claim 1, wherein the lens element comprises a graded index of refraction material and having a generally uniform thickness.

7. The apparatus of claim 1, wherein the lens element comprises a uniform refractive index material having a biconvex shape.

8. An antenna system, comprising:

a primary reflector having a primary reflector surface providing a divergent configuration for incident radio frequency energy;

a secondary reflector having a secondary reflector surface providing a convergent configuration for the radio frequency energy received from the primary reflector surface;

a refraction element configured to diverge a distribution of at least a portion of the radio frequency energy reflected by the secondary reflector surface to increase the distribution of the portion over a detection area of the feed array; and a structure configured to mount and axially align at least the primary reflector, the refraction element, and the feed array.

9. The antenna system of claim 8, wherein the primary reflector comprises a paraboloid of revolution forming a conical shape having a concave parabolic nappe and a central aperture, with a convex side of the primary reflector comprising the primary reflector surface;

wherein the lens element is positioned between the secondary reflector surface and the primary reflector surface; and wherein the feed array is positioned on a side of the primary reflector comprising the concave parabolic nappe and configured to receive a corresponding portion of the radio frequency energy through the aperture as directed by the lens element from the convex side of the primary reflector.

10. The antenna system of claim 8, wherein the primary reflector comprises a conical shape having a concave parabolic nappe, with a convex side of the primary reflector configured as the primary reflector surface.

11. The antenna system of claim 10, wherein the refraction element is positioned between the secondary reflector surface and the feed array offset from the convex side of the primary reflector surface.

12. The antenna system of claim 8, wherein the feed array is mounted on the structure between the refraction element and a transmit feed array.

13. The antenna system of claim 8, wherein the refraction element comprises a graded index material and having a generally uniform thickness.

14. The antenna system of claim 8, wherein the refraction element comprises a uniform refractive index material having a biconvex shape.

15. A method, comprising:

forming a primary reflector having a primary reflector surface providing a divergent configuration for radio frequency energy;

forming a secondary reflector having a secondary reflector surface providing a convergent configuration for the radio frequency energy received from the primary reflector surface;

positioning a lens element such that at least a portion of incident radio frequency energy reflected by the secondary reflector surface has a diverged distribution over a more distributed detection area of a feed array positioned a selected distance from the lens element.

16. The method of claim 15, wherein the refraction element comprises at least one among a uniform refractive index material having a biconvex shape and a graded index material and having a generally uniform thickness.

* * * * *